A. H. FETZER.
TROLLEY WHEEL.
APPLICATION FILED JAN. 27, 1911.
1,044,158. Patented Nov. 12, 1912.
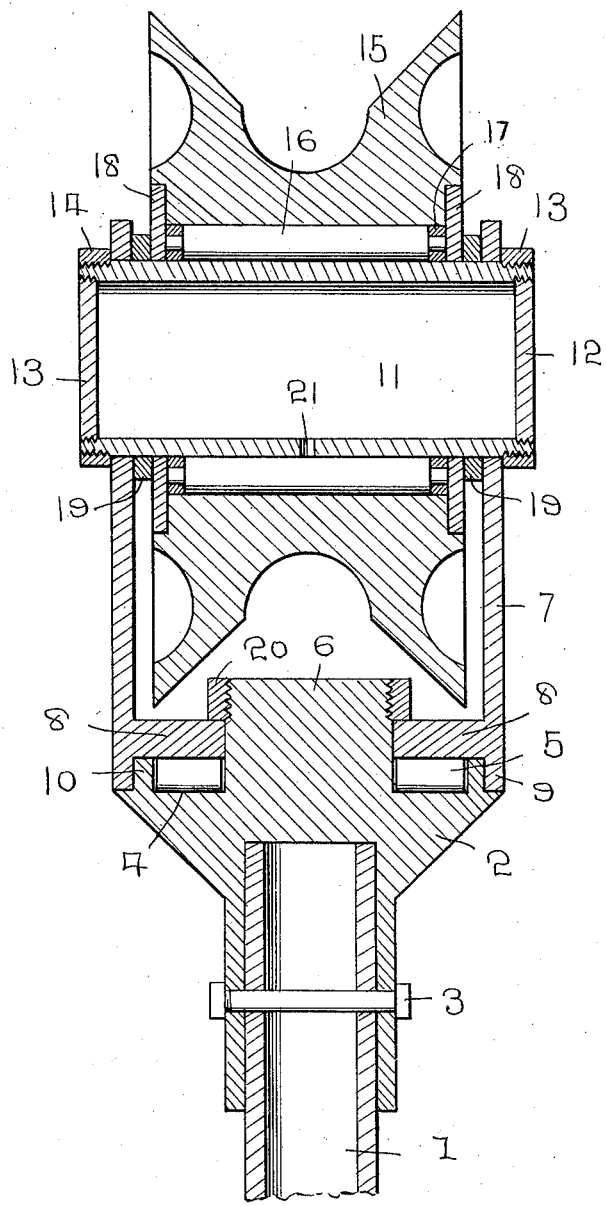
WITNESSES:
Thos. W. Riley
M. Newcomb
INVENTOR
A. H. Fetzer
BY W. J. FitzGerald & Co.
Attorneys

UNITED STATES PATENT OFFICE.

ALLEN H. FETZER, OF GALION, OHIO.

TROLLEY-WHEEL.

1,044,158.  Specification of Letters Patent.  Patented Nov. 12, 1912.

Application filed January 27, 1911. Serial No. 605,124.

*To all whom it may concern:*

Be it known that I, ALLEN H. FETZER, a citizen of the United States, residing at Galion, in the county of Crawford and State of Ohio, have invented certain new and useful Improvements in Trolley-Wheels; and I do hereby declare the following to be a full, clear, and exact description of the invention, such as will enable others skilled in the art to which it appertains to make and use the same.

My invention relates to trolley wheels and more particularly to the mounting thereof, whereby the wheel proper will be provided with nonfrictional devices and will furthermore have a universal movement to accommodate itself to varying strain placed thereon incident to use.

The main object, therefore, of my invention is to provide a trolley wheel which will incidentally conform to varying positions and strains incident to use and the details of construction thereof will be clearly set forth in the following specifications and pointed out in the claim, reference being had to the accompanying drawing in which I have shown a central sectional view of my trolley wheel complete.

Referring in detail to the various elements of my invention and coöperating accessories by numerals, 1 indicates the trolley pole of the usual or any preferred construction, upon the upper end of which I secure in any preferred way the head 2 provided with a socket adapted to fit around the upper end of the trolley pole, whereby the anchoring bolt 3 when placed in position in suitable registering apertures, will reliably hold the appliance together. It will be observed that said head is formed in a peculiar manner, whereby an annular seat or runway 4 is formed therein, said annular seat being for the reception of non-frictional devices, as rollers 5.

Upon the central portion of the head I form the extension or center 6, designed to serve as a pivotal point upon which I mount the bracket 7 having an inward extension or flange 8, which latter rests upon the plurality of rollers or other non-frictional devices, as clearly shown in the drawing.

The lower end of the bracket is also provided with a flange 9, resting against the annular rib 10 forming the outer side of the annular roller-seat before referred to. The bracket 7 is provided at its upper end with an opening in which is located the tubular axle 11, the ends of which are closed by threaded closures 12, 12, either of which may be readily removed when it is desired to gain access to the interior of the tubular axle, as in placing a suitable lubricant therein. Said tubular axle is held in its operative position by means of the threaded collars 13 and 14, all of which are clearly set forth.

Upon the tubular axle I mount the trolley wheel proper 15, made of the usual or any preferred construction and having a bore of sufficient size to fit around a plurality of non-frictional rollers 16 located upon the tubular axle and held in their operative positions by being journaled into the anchoring collars 17.

It will be further observed that a recess is formed on each side of the trolley wheel, within which I locate the disks 18 having a bore of sufficient size to fit snugly around said tubular axle, said disks being designed to exclude all dust, grit and the like coming in contact with the bearing seat proper. I also provide the collars 19, adapted for the purpose of holding the trolley wheel proper a suitable distance from the bracket 7. The bracket is held in its operative position and reliably retained upon the pivotal extension or bearing stud 6 by means of the locking nut 20, or equivalent means, and it is therefore obvious that by thus mounting said bracket and the parts carried thereby upon said bearing stud or extension 6, the said wheel will have a universal movement thereon and will readily conform to the varying strain placed thereon incident to use.

It is furthermore obvious that when a proper lubricant is placed within the tubular axle 11, such lubricant will feed gradually through an aperture or apertures 21 formed in the lower side of said axle and will, therefore, cause said lubricant to flow directly in contact with the non-frictional rollers 16.

Inasmuch as said non-frictional rollers are securely housed against the admission of dust, grit and the like, it follows that sufficient lubricant may be placed within the tubular axle to last almost indefinitely.

It is further obvious that dust, grit and the like is also excluded from the seat occupied by the rollers 5, thereby insuring great permanency and reliability of construction.

Suitable packing may be located at any point deemed vulnerable to the admission of dust. I, therefore, reserve the right to make such addition if found advisable.

What I claim is:

The combination with a supporting head carried upon the upper end of a trolley pole and having a central extension of reduced diameter; of a bracket positioned upon the supporting head, the supporting head having an annular rib around the extension to form an annular seat for bearing rollers between the rib and the extension, the lower edge of the bracket extending downward outwardly of the annular rib, an inwardly directed circular flange carried upon said bracket adjacent its lower edge, bearing rollers within the annular seat, said circular flange resting upon the bearing rollers, and means engaging the upper end of the extension above the inwardly directed circular flange of the bracket to retain the latter in position upon the head.

In testimony whereof I have signed my name to this specification in the presence of two subscribing witnesses.

ALLEN H. FETZER.

Witnesses:
JAMES D. FETZER,
FRANK PIGMAN.

Copies of this patent may be obtained for five cents each, by addressing the "Commissioner of Patents, Washington, D. C."